US012803395B2

(12) United States Patent
Zhang et al.

(10) Patent No.: US 12,803,395 B2
(45) Date of Patent: Nov. 17, 2026

(54) INTEGRATED MOTOR CONTROLLER, ELECTRIC ASSEMBLY, AND VEHICLE

(71) Applicant: BYD COMPANY LIMITED, Shenzhen (CN)

(72) Inventors: Xingchun Zhang, Shenzhen (CN); Fengchuan Yu, Shenzhen (CN); Haiping Sun, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 176 days.

(21) Appl. No.: 18/883,535

(22) Filed: Sep. 12, 2024

(65) Prior Publication Data

US 2025/0007365 A1 Jan. 2, 2025

Related U.S. Application Data

(63) Continuation of application No. PCT/CN2023/102362, filed on Jun. 26, 2023.

(30) Foreign Application Priority Data

Jun. 30, 2022 (CN) ......................... 202221669903.5

(51) Int. Cl.

| | |
|---|---|
| ***H02K 11/33*** | (2016.01) |
| ***H02K 9/19*** | (2006.01) |
| ***H02K 11/00*** | (2016.01) |

(52) U.S. Cl.

CPC ............... *H02K 11/33* (2016.01); *H02K 9/19* (2013.01); *H02K 11/0094* (2013.01); *H02K 2211/03* (2013.01)

(58) Field of Classification Search

CPC ...... H02K 11/33; H02K 9/19; H02K 11/0094; H02K 2211/03; B60L 15/20; B60L 53/00; B60L 53/22; B60L 53/24; Y02T 10/70; Y02T 10/7072; Y02T 90/14; B60K 11/02; B60K 2001/003; B60Y 2200/91; B60Y 2306/05

See application file for complete search history.

(56) References Cited

FOREIGN PATENT DOCUMENTS

| | | |
|---|---|---|
| CN | 111434513 A | 7/2020 |
| CN | 112224033 A | 1/2021 |
| CN | 112224053 A | 1/2021 |
| CN | 112224054 A | 1/2021 |
| CN | 112339587 A | 2/2021 |

(Continued)

OTHER PUBLICATIONS

International Search Report and Written Opinion for Application No. PCT/CN2023/102362, mailed on Aug. 17, 2023, 11 pages.

*Primary Examiner* — Thomas Truong
(74) *Attorney, Agent, or Firm* — Sheppard Mullin Richter & Hampton LLP

(57) ABSTRACT

An integrated motor controller includes a charging connector, a battery connector, a first charging circuit, and a second charging circuit. The first charging circuit is connected with the charging connector and the battery connector, and includes a first control switch. The first control switch is configured to control on/off of the first charging circuit. The second charging circuit is connected with the charging connector and the battery connector, and includes a boost module and a second control switch. The second control switch is configured to control on/off of the second charging circuit.

18 Claims, 7 Drawing Sheets

(56) References Cited

FOREIGN PATENT DOCUMENTS

| | | | | | |
|---|---|---|---|---|---|
| CN | 112550023 | A | * | 3/2021 | .............. B60L 53/22 |
| CN | 215452563 | U | | 1/2022 | |
| CN | 217598358 | U | | 10/2022 | |
| DE | 102018207185 | A1 | | 11/2019 | |
| WO | WO-2020074390 | A2 | * | 4/2020 | ............ H02M 3/158 |
| WO | 2021012219 | A1 | | 1/2021 | |

* cited by examiner

INTEGRATED MOTOR CONTROLLER, ELECTRIC ASSEMBLY, AND VEHICLE

CROSS-REFERENCE TO RELATED APPLICATIONS

This application is a continuation application of International Patent Application No. PCT/CN2023/102362, filed on Jun. 26, 2023, which is based on and claims the priority to and benefits of Chinese Patent Application No. 202221669903.5, filed on Jun. 30, 2022. The entire content of all of the above-referenced applications is incorporated herein by reference.

FIELD

The present disclosure relates to the field of vehicle technologies, and more particularly, to an integrated motor controller, an electric assembly, and a vehicle.

BACKGROUND

In the related art, a battery of a vehicle can be fast charged usually on a direct current (DC) high-voltage charging pile corresponding to a charging voltage of the vehicle, and has a specific requirement for the charging voltage, resulting in relatively low charging versatility of the vehicle and poor user experience.

SUMMARY

The present disclosure is to resolve at least one of technical problems existing in the related art. Therefore, the present disclosure provides an integrated motor controller. The integrated motor controller is applicable to different charging voltages, and has advantages such as high versatility and convenient charging. The present disclosure further provides an electric assembly having the above integrated motor controller.

The present disclosure further provides a vehicle having the above electric assembly.

An integrated motor controller according to an embodiment of a first aspect of the present disclosure includes a charging connector, a battery connector, a first charging circuit, and a second charging circuit. The first charging circuit is connected with the charging connector and the battery connector, and includes a first control switch. The first control switch is configured to control on/off of the first charging circuit. The second charging circuit is connected with the charging connector and the battery connector, and includes a boost module and a second control switch. The second control switch is configured to control on/off of the second charging circuit.

The integrated motor controller according to the embodiments of the present disclosure is applicable to different charging voltages, and has advantages such as high versatility and convenient charging.

According to some examples of the present disclosure, the integrated motor controller further includes an alternating current (AC) charging and discharging connector, and an AC charging and discharging circuit. The AC charging and discharging circuit includes an on-board charger (OBC) and a direct current (DC)/DC converter, the OBC is connected with the AC charging and discharging connector, and the DC/DC converter is connected with the battery connector.

According to some examples of the present disclosure, the charging connector includes a DC charging connector. The boost module includes a motor coil and an electrical control bridge arm. The motor coil is a coil of a driving motor. The motor coil is connected with the second charging circuit. The electrical control bridge arm is a bridge arm of an insulated gate bipolar transistor (IGBT) module of a motor controller. The electrical control bridge arm is connected with the motor coil.

According to some examples of the present disclosure, the integrated motor controller further includes a boost capacitor and a smoothing capacitor. The boost capacitor is connected with the charging connector, the battery connector, and the IGBT module. The smoothing capacitor is connected with the IGBT module and the battery connector.

According to some examples of the present disclosure, the integrated motor controller further includes a capacitor housing, a positive battery electrode connection plate, a negative battery electrode connection plate, an output connection plate, a positive charging electrode connection plate, and a negative charging electrode connection plate. The boost capacitor and the smoothing capacitor are mounted to the capacitor housing. The positive battery electrode connection plate is mounted to the capacitor housing. The positive battery electrode connection plate is connected with a positive electrode of the battery connector and a positive electrode of the smoothing capacitor. The negative battery electrode connection plate is mounted to the capacitor housing. The negative battery electrode connection plate is connected with a negative electrode of the battery connector and a negative electrode of the smoothing capacitor. The output connection plate is mounted to the capacitor housing. The output connection plate is connected with the smoothing capacitor and the IGBT module. The positive charging electrode connection plate is mounted to the capacitor housing. The positive charging electrode connection plate is connected with a positive electrode of the charging connector and the boost capacitor. The negative charging electrode connection plate is mounted to the capacitor housing. The negative charging electrode connection plate is connected with a negative electrode of the charging connector, the boost capacitor, the smoothing capacitor, and the negative battery electrode connection plate.

According to some examples of the present disclosure, the capacitor housing has a first side edge, a second side edge, a third side edge, and a fourth side edge connected in a circumferential direction of the capacitor housing. The positive battery electrode connection plate, the negative battery electrode connection plate, and the negative charging electrode connection plate are mounted to the first side edge. The output connection plate is mounted to the second side edge. The positive charging electrode connection plate is mounted to the third side edge.

According to some examples of the present disclosure, the integrated motor controller further includes a circuit safety protection member. The circuit safety protection member is mounted to the capacitor housing. The circuit safety protection member is connected with the negative battery electrode connection plate and the negative electrode of the smoothing capacitor.

According to some examples of the present disclosure, the integrated motor controller further includes a charging side magnetic ring and a battery side magnetic ring. The charging side magnetic ring is mounted to an outer peripheral surface of the capacitor housing. The charging connector is connected to the positive charging electrode connection plate and the negative charging electrode connection plate through an intermediate connector. The charging side magnetic ring is sleeved on the intermediate connector. The battery side magnetic ring is mounted to the outer peripheral surface of the capacitor housing. The battery side magnetic ring is sleeved on the battery connector.

According to some examples of the present disclosure, the integrated motor controller further includes a heat dissipation metal plate and heat transfer cement. The heat dissipation metal plate is attached to the capacitor housing. A first surface of the heat transfer cement in a thickness direction of the heat transfer cement is attached to the heat dissipation metal plate. A second surface of the heat transfer cement in the thickness direction is attached to a box.

According to some examples of the present disclosure, the integrated motor controller further includes a box, a driving board, a control board, and a power device. A first chamber is disposed on a first side of the box in a thickness direction of the box. A second chamber is arranged on a second side of the box in the thickness direction. The IGBT module is mounted to the first chamber. The driving board is mounted to the first chamber. The driving board is connected with the IGBT module. The control board is mounted to the first chamber. The control board is connected with the driving board. The power device is mounted to the second chamber, and is connected with the control board.

According to some examples of the present disclosure, the box includes a first water channel and a second water channel. The first water channel is configured to be in communication with a water inlet pipe. The second water channel is configured to be in communication with a water outlet pipe. The integrated motor controller further includes a water channel cover plate. The water channel cover plate is connected with the box. The water channel cover plate is configured to cover the first water channel and the second water channel. The water channel cover plate includes a third water channel. The third water channel is in communication with the first water channel and the second water channel. A cooling liquid in the first water channel flows into the third water channel to dissipate heat for the IGBT module. A cooling liquid in the third water channel flows into the second water channel to dissipate heat for the power device.

According to some examples of the present disclosure, multiple IGBT modules are arranged. The third water channel includes multiple cooling cavities disposed in a length direction of the third water channel. The multiple cooling cavities are in one-to-one correspondence with the multiple IGBT modules. Each of the cooling cavities includes a water inlet and a water outlet. A water inlet of a first one of two adjacent cooling cavities is adjacent to and in communication with a water outlet of a second one of the two adjacent cooling cavities. The first water channel is in communication with the water inlet of the cooling cavity adjacent to the first water channel. The second water channel is in communication with the water outlet of the cooling cavity adjacent to the second water channel. At least one partition plate is disposed on a side of the water channel cover plate facing the box. The partition plate is configured to prevent communication between the second water channel and a water inlet and a water outlet adjacent to the second water channel.

According to some examples of the present disclosure, the second water channel includes a transition section and an annular section. The transition section is brought into communication with the water outlet of the cooling cavity adjacent to the transition section. The annular section surrounds the power device. The annular section is configured to dissipate heat for the power device. A first end of the annular section is connected with an end of the transition section. A second end of the annular section includes a water outlet hole. A depth of the annular section is greater than a depth of the first water channel. The depth of the annular section is greater than a depth of the transition section.

According to some examples of the present disclosure, the integrated motor controller further includes a water inlet pipe and a water outlet pipe. The water inlet pipe is mounted to the box. The water inlet pipe is in communication with the first water channel. The water outlet pipe is mounted to the box. The water outlet pipe is in communication with the water outlet hole. The water outlet pipe and the water inlet pipe are vertically disposed.

According to some examples of the present disclosure, the integrated motor controller includes a charging connector, a battery connector, a first charging circuit, and a second charging circuit. The charging connector is configured to connect to a charging device. The battery connector is configured to connect to a battery pack. The first charging circuit is connected with the charging connector and the battery connector. The second charging circuit is connected with the charging connector and the battery connector. The second charging circuit includes a boost module. One of the first charging circuit and the second charging circuit is turned on.

According to some examples of the present disclosure, when a voltage provided by the charging device is greater than a first voltage, the first charging circuit is turned on. When the voltage provided by the charging device is not greater than the first voltage, the second charging circuit is turned on.

According to some examples of the present disclosure, the boost module includes an electrical control bridge arm and three motor coils. The electrical control bridge arm includes a three-phase bridge arm including three bridge arms. First ends of the three motor coils are respectively connected with midpoints of the three bridge arms, and second ends of the three motor coils are connected with the charging connector.

An electric assembly according to an embodiment of a second aspect of the present disclosure is provided. The electric assembly includes the integrated motor controller according to the above embodiment of the first aspect of the present disclosure.

The electric assembly according to the embodiments of the present disclosure is applicable to different charging voltages through the above integrated motor controller, and has advantages such as high versatility and convenient charging.

A vehicle according to an embodiment of a third aspect of the present disclosure is provided. The vehicle includes the electric assembly according to the above embodiment of the second aspect of the present disclosure.

The vehicle according to the embodiments of the present disclosure is applicable to different charging voltages through the above electric assembly, and has advantages such as high versatility and convenient charging.

Additional aspects and advantages of the present disclosure are to be partially given in the following description, some of which become apparent from the following description or may be learned by practice of the present disclosure.

BRIEF DESCRIPTION OF THE DRAWINGS

The above and/or additional aspects and advantages of the present disclosure become apparent and comprehensible from the descriptions of embodiments with reference to accompanying drawings below.

Numerals

Figure 1:
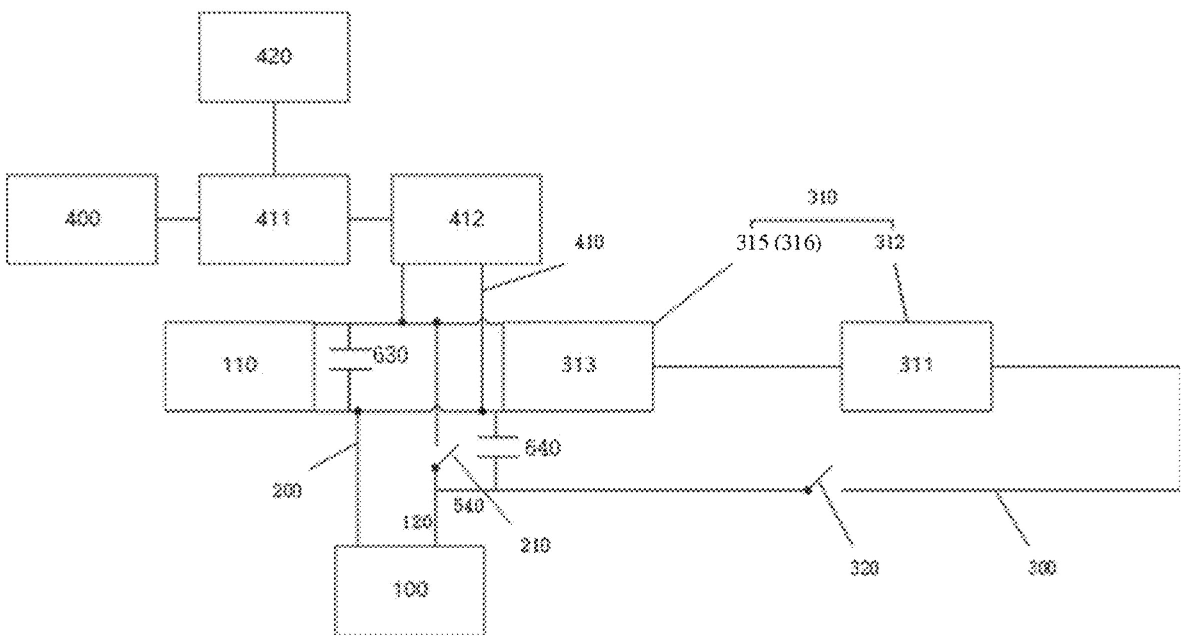
FIG. 1 is a diagram of a principle of an integrated motor controller according to an embodiment of the present disclosure.
Figure 2:
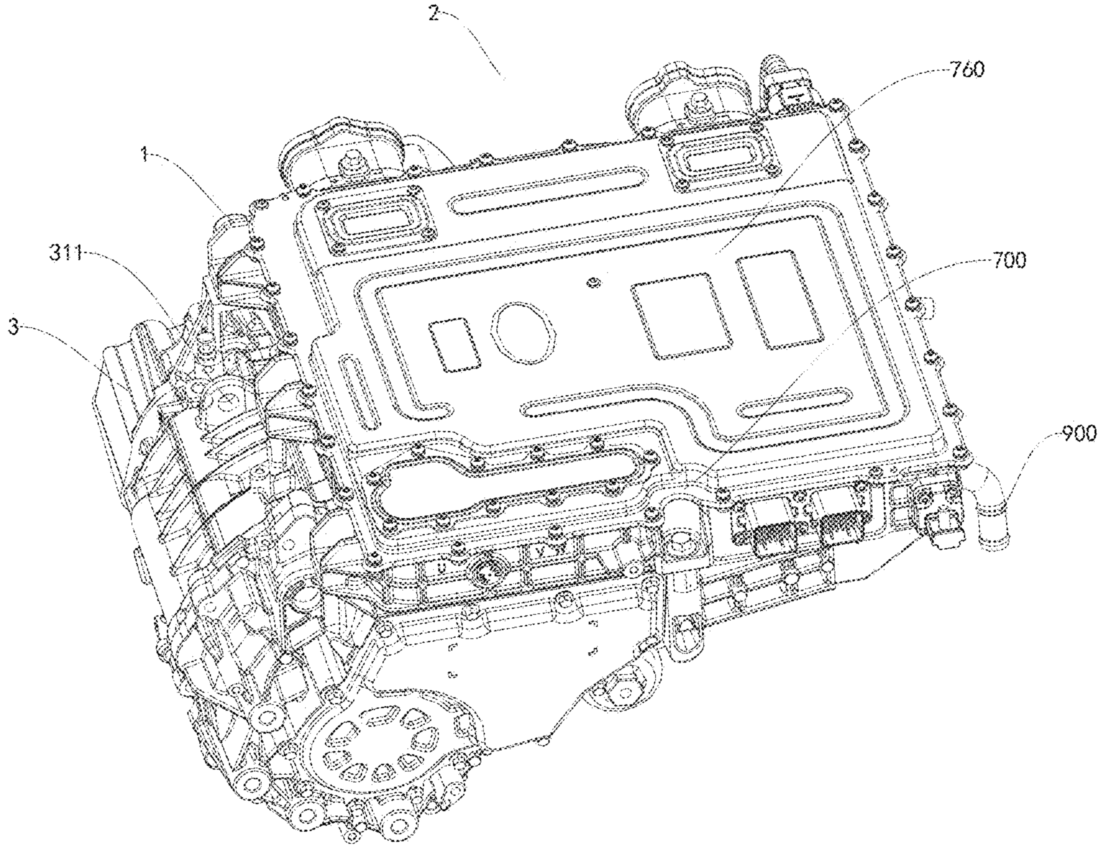
FIG. 2 is a schematic structural diagram of an electric assembly according to an embodiment of the present disclosure.
Figure 3:
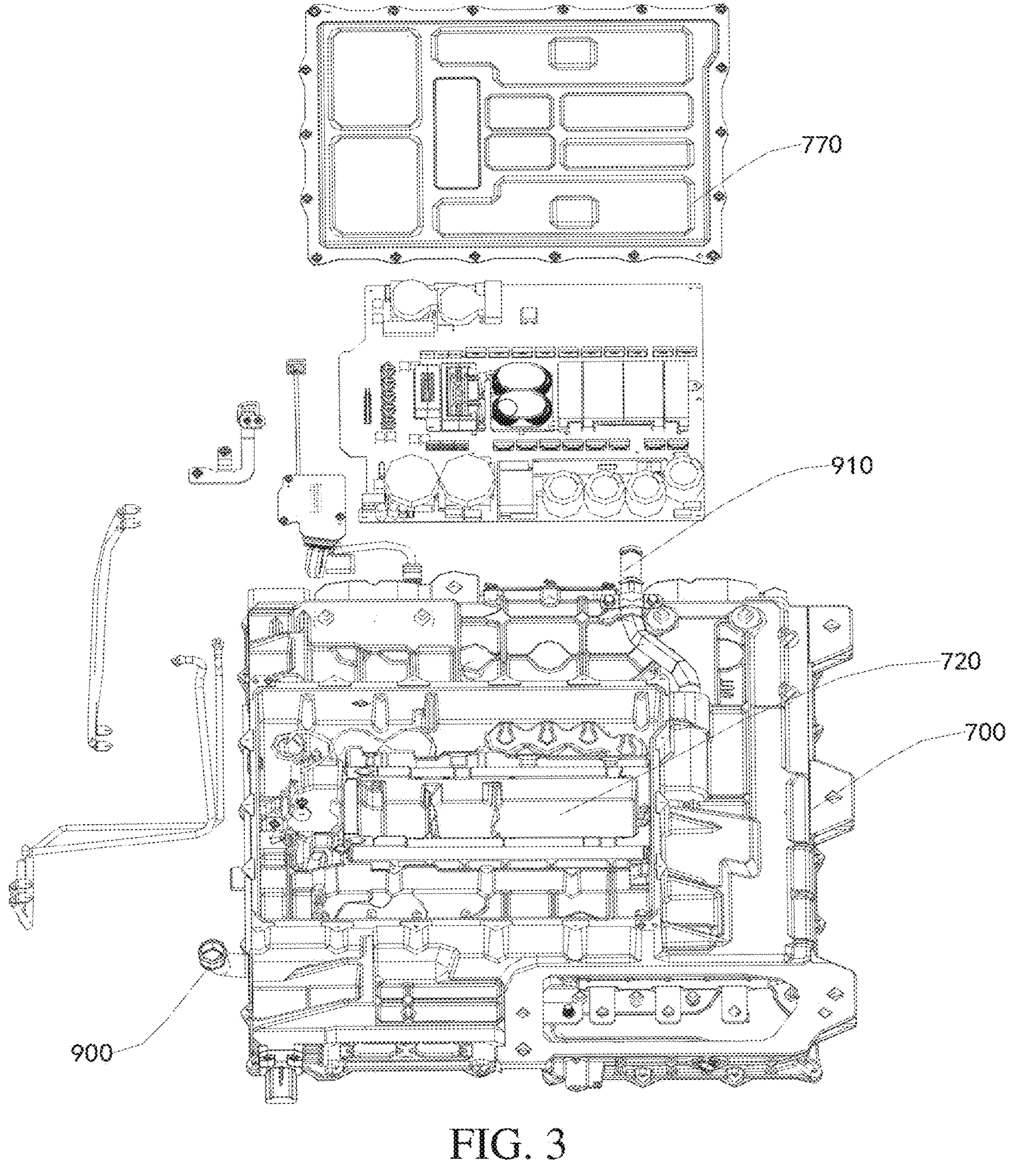
FIG. 3 is an exploded view of an integrated motor controller according to an embodiment of the present disclosure.

1: Integrated motor controller; 2: Electric assembly; 3: Transmission; 4: Vehicle;

100: Charging connector; 110: Battery connector; 120: Intermediate connector; 200: First charging circuit; 210: First control switch; 300: Second charging circuit; 310: Boost module; 311: Driving motor; 312: Motor coil; 313: Motor controller; 315: Insulated gate bipolar transistor (IGBT) module; 316: Electrical control bridge arm; 320: Second control switch; 400: Alternating current (AC) charging and discharging connector; 410: AC charging and discharging circuit; 411: On-board charger (OBC); 412: Direct current (DC)/DC converter; 420: In-vehicle discharging connector; 500: Capacitor housing; 501: First side edge; 502: Second side edge; 503: Third side edge; 504: Fourth side edge; 505: Wire harness fixing groove; 506: Cable tie hole; 510: Positive battery electrode connection sheet; 520: Negative battery electrode connection sheet; 530: Output connection sheet; 540: Positive charging electrode connection sheet; 550: Negative charging electrode connection sheet; 590: Negative input sheet; 591: Heat dissipation metal plate; 592: Heat transfer cement; 5921: First surface; 5922: Second surface; 593: Magnetic ring mounting position; 600: Circuit safety protection member; 610: Charging side magnetic ring; 620: Battery side magnetic ring; 630: Smoothing capacitor; 640: Boost capacitor; 700: Box; 701: First side; 702: Second side; 710: First chamber; 711: Second water channel; 712: First water channel; 713: Transition section; 714: Annular section; 715: First end; 716: Second end; 717: Water outlet hole; 720: Second chamber; 730: Driving board; 740: Control board; 750: Power device; 760: Upper cover; 770: Lower cover; 800: Water channel cover plate; 810: Third water channel; 811: Cooling cavity; 812: Water inlet; 813: Water outlet; 820: Partition plate; 840: Sealing groove; 900: Water inlet pipe; 910: Water outlet pipe; and 911: Pressing plate.

DETAILED DESCRIPTION

Embodiments of the present disclosure are described in detail below, and examples of the embodiments are shown in accompanying drawings. Same or similar reference numerals throughout represent same or similar elements or elements having the same or similar functions. The embodiments described below with reference to the accompanying drawings are exemplary, and used for explaining the present disclosure only, and should not be construed as a limitation on the present disclosure.

In the description of the present disclosure, it should be understood that orientation or position relationships indicated by the terms such as “center”, “up”, “down”, “front”, “rear”, “left”, “right”, “vertical”, “horizontal”, “top”, “bottom”, “inside”, and “outside” are based on orientation or position relationships shown in the accompanying drawings, and are used for convenience and simplification of description of the present disclosure only, rather than indicating or implying that the indicated apparatus or element needs to have a particular orientation or to be constructed and operated in a particular orientation. Therefore, the terms should not be construed as a limitation on the present disclosure.

It should be noted that, terms “first” and “second” are merely used for description, and cannot be construed as indicating or implying relative importance or implicitly indicating a quantity of indicated technical features. Therefore, features defined by “first” and “second” may explicitly or implicitly include one or more such features. Further, in the description of the present disclosure, unless otherwise stated, “multiple” means two or more than two.

An integrated motor controller 1 according to an embodiment of the present disclosure is described below with reference to the accompanying drawings.

As shown in FIG. 1 to FIG. 10, the integrated motor controller 1 according to an embodiment of the present disclosure includes a charging connector 100, a battery connector 110, a first charging circuit 200, and a second charging circuit 300.

The first charging circuit 200 is connected with the charging connector 100 and the battery connector 110. The first charging circuit 200 is provided with a first control switch 210. The first control switch 210 is configured to control on/off of the first charging circuit 200. The second charging circuit 300 is connected with the charging connector 100 and the battery connector 110. The second charging circuit 300 is provided with a boost module 310 and a second control switch 320. The second control switch 320 is configured to control on/off of the second charging circuit 300.

For example, the first control switch 210 and the second control switch 320 may be contactors. The charging connector 100 and the battery connector 110 may be plugs. Moreover, the charging connector 100 may be connected with an external charging device. For example, the charging connector 100 may be connected with a charging pile. The battery connector 110 may be connected with a battery pack of a vehicle.

In the integrated motor controller 1 according to this embodiment of the present disclosure, the first charging circuit 200 is connected with the charging connector 100 and the battery connector 110, and the first charging circuit 200 is provided with the first control switch 210 configured to control the on/off of the first charging circuit 200. In this way, when the charging connector 100 is connected with a charging device with a relatively high voltage (the voltage being not less than 750 V), for example, when the charging connector 100 is connected with a charging device with a charging voltage of 750 V, the first control switch 210 may be in an on state (e.g., the first control switch is turned on), so that a current may directly charge the battery connector 110 through the first charging circuit 200, thereby achieving fast charging of the battery pack.

In addition, the second charging circuit 300 is connected with the charging connector 100 and the battery connector 110, and the second charging circuit 300 is provided with the boost module 310 and the second control switch 320 configured to control the on/off of the second charging circuit 300. In this way, when the charging connector 100 is connected with a charging device with a relatively low voltage (the voltage being less than 750 V), for example, when the charging connector 100 is connected with a charging device with a charging voltage of 470 V, the second control switch 320 may be in the on state (e.g., the second control switch is turned on), so that the current may flow through the second charging circuit 300, the boost module 310 may boost a voltage of the second charging circuit 300, the voltage of the second charging circuit 300 may be boosted to above 630 V, and then the battery pack may be fast charged.

Moreover, when the charging connector 100 is not connected with the charging device, the first control switch 210 and the second control switch 320 both may be in an off state (e.g., the control switches are turned off). When the charging connector 100 is connected with the charging device, the integrated motor controller 1 may detect an output voltage of the charging device. If a charging voltage is relatively high, the first control switch 210 is turned on, and the second control switch 320 is turned off. The charging device may directly charge the battery pack through the first charging circuit 200. If the charging voltage is relatively low, the second control switch 320 is turned on, and the first control switch 210 is turned off. The charging device may perform boosting through the boost module 310 of the second charging circuit 300, and then charge a battery.

In this way, the first control switch 210 and the second control switch 320 are generally not turned off simultaneously, to reduce a voltage fluctuation during the charging, thereby maintaining a stable charging voltage. In addition, the controlling on and off of the first control switch 210 and the second control switch 320 can cause the charging connector 100 to be connected to the battery connector 110 through different charging circuits, to ensure that the charging voltage is high enough to achieve the fast charging of the battery pack, and prevent the battery pack from being damaged due to an excessively high charging voltage, thereby ensuring good safety. Therefore, the integrated motor controller 1 according to this embodiment of the present disclosure is applicable to multiple charging devices, and can achieve the fast charging of the battery pack regardless of the output voltage of the charging device, so that charging is more convenient and time-efficient.

In this way, the integrated motor controller 1 according to this embodiment of the present disclosure is applicable to different charging voltages, and has advantages such as high versatility and convenient charging.

In some embodiments of the present disclosure, as shown in FIG. 1, the integrated motor controller 1 further includes an alternating current (AC) charging and discharging connector 400 and an AC charging and discharging circuit 410.

The AC charging and discharging circuit 410 is provided with an on-board charger (OBC) 411 and a direct current (DC)/DC converter 412. The OBC 411 is connected with the AC charging and discharging connector 400. The DC/DC converter 412 is connected with the battery connector 110.

The OBC 411 can dynamically adjust a charging voltage parameter and a charging current parameter based on a charging current and a charging voltage required for the battery pack, so as to charge the battery pack and protect the battery pack. Moreover, an in-vehicle discharging connector 420 may be connected with the OBC 411, to charge an item that needs to be charged by a passenger with an AC.

In this way, the AC charging and discharging connector 400 may provide access to an AC power supply, and the battery may be charged through the AC power supply. The OBC 411 can adjust a parameter of an AC voltage. A magnitude of the charging voltage is changed while converting the AC into the DC, so as to charge the battery pack.

Moreover, the DC/DC converter 412 can perform voltage and current stabilization on a DC flowing through the OBC 411, and may convert a low-voltage charging current into a high-voltage charging current, to achieve the fast charging of the battery pack. In addition, the battery pack may also transmit the AC to the AC charging and discharging connector 400 through the AC charging and discharging circuit 410, so that the AC charging and discharging connector 400 may supply power to an electric appliance in the vehicle that uses the AC power supply.

In some embodiments of the present disclosure, the charging connector 100 is a DC charging connector 100. The boost module 310 includes a motor coil 312 and an electrical control bridge arm 316.

The motor coil 312 is a coil of a driving motor 311. The motor coil 312 is connected with the second charging circuit 300. The electrical control bridge arm 316 is a bridge arm of an insulated gate bipolar transistor (IGBT) module 315 of a motor controller 313. The electrical control bridge arm 316 is connected with the motor coil 312. In this way, a current flowing through the second charging circuit 300 may flow through the motor coil 312 and the electrical control bridge arm 316 in sequence, to form the boost module 310 through the motor coil 312 and the electrical control bridge arm 316, and boost the current of the second charging circuit 300, thereby achieving the fast charging of the battery.

In this way, the boost module 310 and the motor controller 313 share the bridge arm of the IGBT module 315 of the motor controller 313, and the boost module 310 and the driving motor 311 share the motor coil 312. Electronic devices such as an inductor, a diode, and a switching device do not need to be additionally arranged, which reduces a quantity of parts, and reduces production costs, thereby helping reduce a volume of an electric assembly 2.

Moreover, since the driving motor 311 is generally a three-phase motor, that is, the driving motor 311 has three sets of motor coils 312, each of the three sets of motor coil 312 of the driving motor 311 is applied to the boost module 310, so that a probability of a ripple current generated by the second charging circuit 300 can be reduced, thereby further ensuring stability of an input voltage of the battery pack.

In some embodiments of the present disclosure, the integrated motor controller 1 further includes a boost capacitor 640 and a smoothing capacitor 630.

The boost capacitor 640 is connected with the charging connector 100, the battery connector 110, and the IGBT module 315. The smoothing capacitor 630 is connected with the IGBT module 315 and the battery connector 110. When the battery pack supplies power to the IGBT module 315 for vehicle driving, a current of the battery pack first flows through the smoothing capacitor 630, which may absorb a ripple current in the current flowing to the battery connector 110 and store energy. In this way, the battery pack performs filtering and maintains a stable voltage and current when supplying power to the IGBT module 315. During boost charging, a boosted current of the motor coil 312 flows through the IGBT module 315 to the smoothing capacitor 630, so that the smoothing capacitor 630 absorbs the boosted ripple current of the circuit and stores energy. In this way, the voltage is stable when the current flows to the battery pack during charging.

In this way, voltage stability of the battery connector 110 is maintained, thereby maintaining stability of the charging voltage and a discharging voltage of the battery pack. However, the smoothing capacitor 630 and the motor coil may form an L/C circuit. The boost capacitor 640 is arranged/configured to absorb a ripple current in a current inputted from the charging connector 100, and filter the current inputted from the charging connector 100, so that a voltage of the current inputted from the charging connector 100 is stable.

Figure 6:
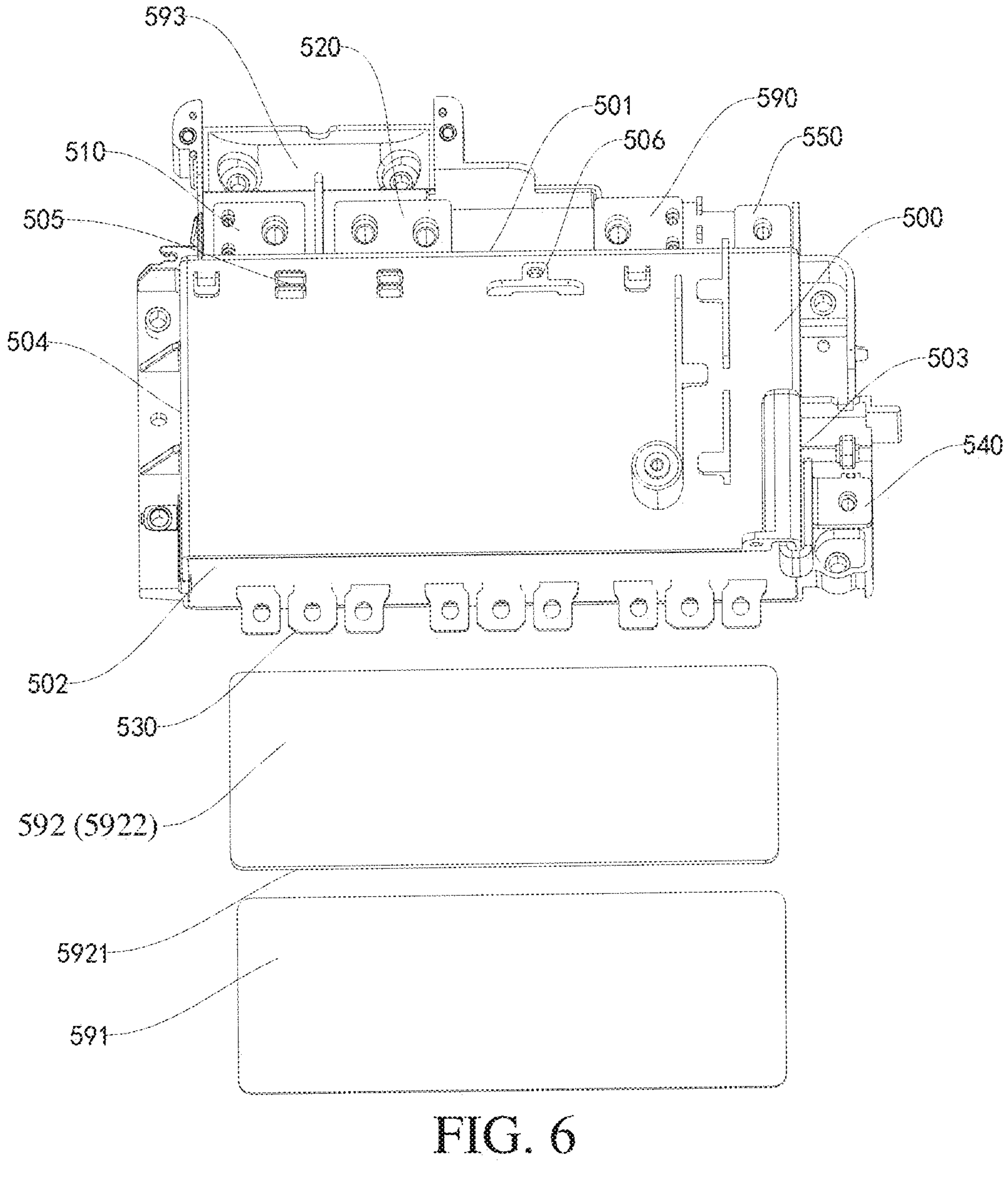
FIG. 6 is a schematic structural diagram of a capacitor housing according to an embodiment of the present disclosure.

In some embodiments of the present disclosure, as shown in FIG. 6, the integrated motor controller 1 further includes a capacitor housing 500, a positive battery electrode connection plate/sheet 510, a negative battery electrode connection plate/sheet 520, an output connection plate/sheet 530, a positive charging electrode connection plate/sheet 540, and a negative charging electrode connection plate/sheet 550.

The boost capacitor 640 and the smoothing capacitor 630 are mounted to the capacitor housing 500. The positive battery electrode connection sheet 510 is mounted to the capacitor housing 500. The positive battery electrode connection sheet 510 is connected with a positive electrode of the battery connector 110 and a positive electrode of the smoothing capacitor 630. The negative battery electrode connection sheet 520 is mounted to the capacitor housing 500. The negative battery electrode connection sheet 520 is connected with a negative electrode of the battery connector 110 and a negative electrode of the smoothing capacitor 630. The output connection sheet 530 is mounted to the capacitor housing 500. The output connection sheet 530 is connected with the smoothing capacitor 630 and the IGBT module 315. The positive charging electrode connection sheet 540 is mounted to the capacitor housing 500. The positive charging electrode connection sheet 540 is connected with a positive electrode of the charging connector 100 and the boost capacitor 640. The negative charging electrode connection sheet 550 is mounted to the capacitor housing 500. The negative charging electrode connection sheet 550 is connected with a negative electrode of the charging connector 100, the boost capacitor 640, the smoothing capacitor 630, and the negative battery electrode connection sheet 520.

For example, to enhance heat dissipation of the boost capacitor 640 and the smoothing capacitor 630, a heat dissipation metal plate 591 and heat transfer cement 592 are arranged on the capacitor housing 500. The heat dissipation metal plate 591 is attached to the capacitor housing 500. A first surface 5921 of the heat transfer cement 592 is attached to the heat dissipation metal plate 591. A second surface 5922 of the heat transfer cement 592 is attached to an electric control box. In other words, the heat transfer cement 592 is arranged between the heat dissipation metal plate 591 and the electric control box, which helps heat of the capacitor be transferred to the electric control box through the heat transfer cement 592 as a medium to dissipate the heat of the capacitor. To facilitate wire harness wiring, the capacitor housing 500 may be further constructed with structures such as a wire harness fixing groove 505 or a cable tie hole 506.

The boost capacitor 640 and the smoothing capacitor 630 may be integrated into the capacitor housing 500, which facilitates arrangement and saves an assembly space. Therefore, the capacitor housing 500 may fix the positive battery electrode connection sheet 510, the negative battery electrode connection sheet 520, the output connection sheet 530, the positive charging electrode connection sheet 540, and the negative charging electrode connection sheet 550. The positive battery electrode connection sheet 510, the negative battery electrode connection sheet 520, the output connection sheet 530, the positive charging electrode connection sheet 540, and the negative charging electrode connection sheet 550 may be exposed from the capacitor housing 500. In this way, the battery pack is connected with the smoothing capacitor 630, and the boost capacitor 640 is connected with the charging connector 100. Therefore, the connection is more reliable, and assembly efficiency is higher.

In some embodiments of the present disclosure, as shown in FIG. 6, the capacitor housing 500 has a first side edge 501, a second side edge 502, a third side edge 503, and a fourth side edge 504 connected end to end in a circumferential direction of the capacitor housing 500. The positive battery electrode connection sheet 510, the negative battery electrode connection sheet 520, and the negative charging electrode connection sheet 550 are mounted to the first side edge 501. The output connection sheet 530 is mounted to the second side edge 502. The positive charging electrode connection sheet 540 is mounted to the third side edge 503.

In this way, the positive battery electrode connection sheet 510, the negative battery electrode connection sheet 520, and the negative charging electrode connection sheet 550 may be spaced apart from the output connection sheet 530 and the positive charging electrode connection sheet 540, to avoid positional interference between multiple components and facilitate mounting. In addition, a short circuit may be prevented from occurring among the multiple components during a power-up to maintain an unobstructed circuit.

Figure 5:
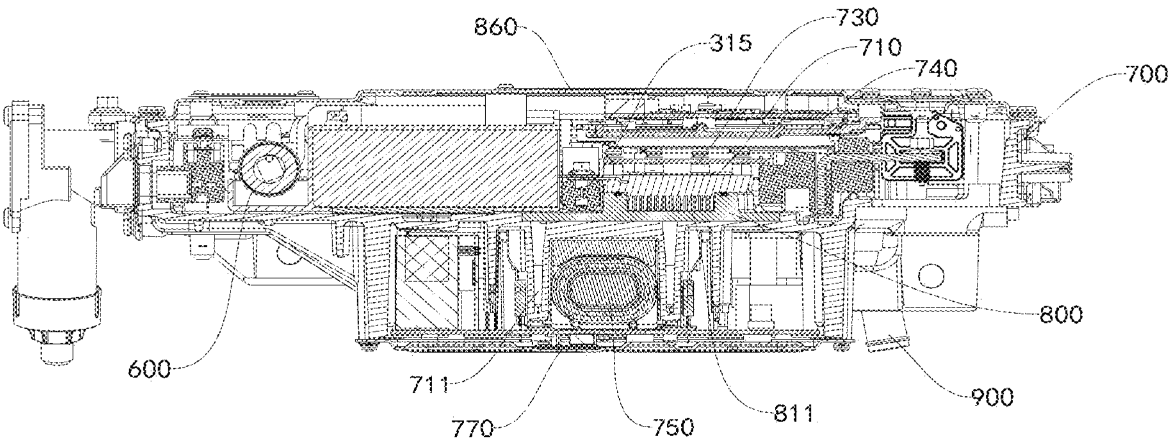
FIG. 5 is a cross-sectional view of an integrated motor controller according to an embodiment of the present disclosure.

In some embodiments of the present disclosure, as shown in FIG. 5, the integrated motor controller 1 further includes a circuit safety protection member 600.

The circuit safety protection member 600 is mounted to the capacitor housing 500. The circuit safety protection member 600 is connected with the negative battery electrode connection sheet 520 and the negative electrode of the smoothing capacitor 630. For example, the circuit safety protection member 600 may be a fuse. The integrated motor controller 1 further includes a negative input plate/sheet 590. Two ends of the circuit safety protection member 600 are respectively connected with the negative input sheet 590 and the negative battery electrode connection sheet 520. The negative battery electrode connection sheet 520 is connected with the negative electrode of the smoothing capacitor 630. The negative battery electrode connection sheet 520 is connected with the negative electrode of the smoothing capacitor 630 through the circuit safety protection member 600 and the negative input sheet 590. The negative battery electrode connection sheet 520 is mounted to the first side edge 501.

Therefore, when an overcurrent and temperature rise in the circuit occur as a result of a current flowing through the negative battery electrode connection sheet 520 and a current of the smoothing capacitor 630 being excessively large, the circuit safety protection member 600 may be disconnected, to cut off the current of the circuit and then avoid damage to the battery pack. This improves safety during charging and discharging of the battery pack.

Figure 4:
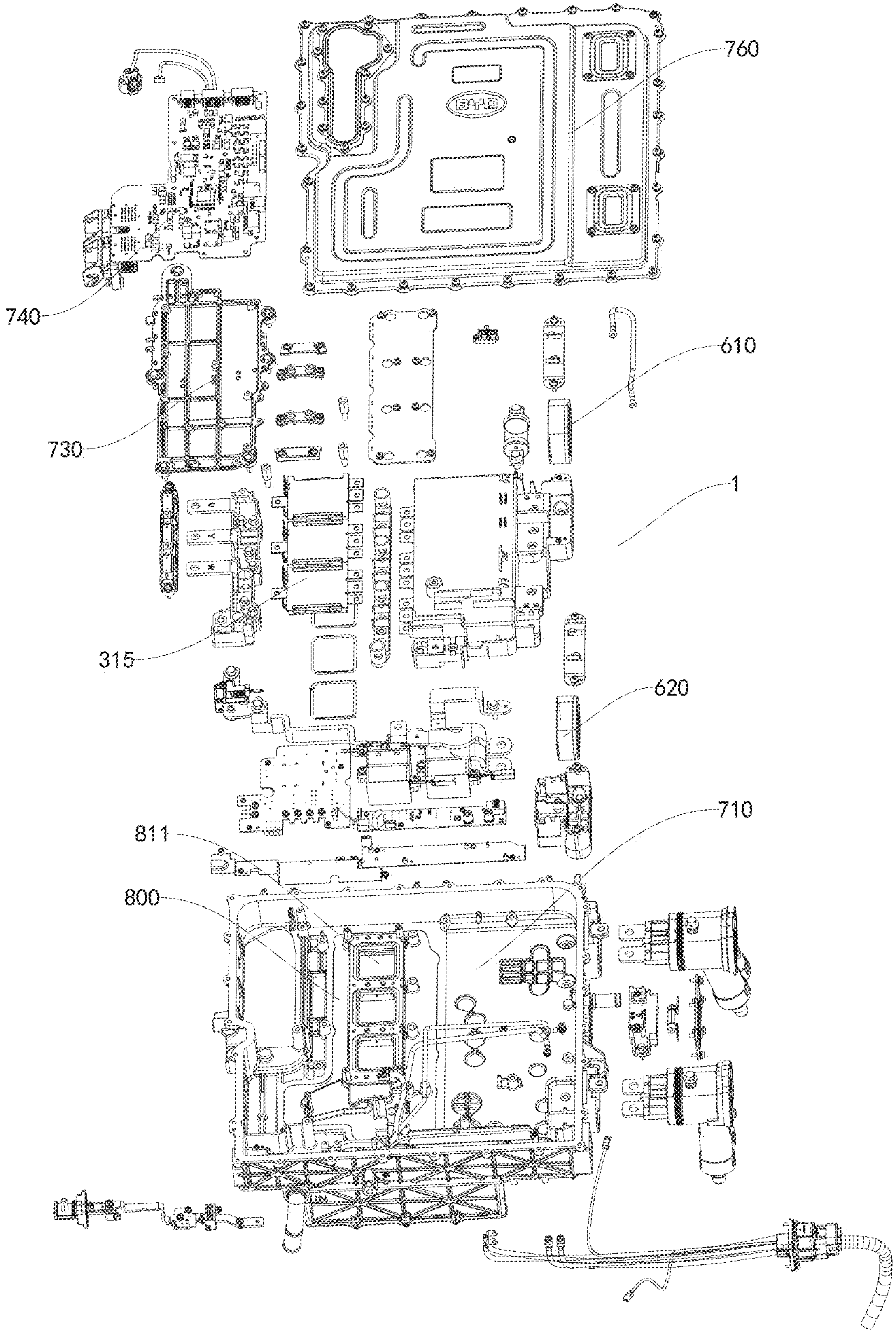
FIG. 4 is another exploded view of an integrated motor controller according to an embodiment of the present disclosure.

In some embodiments of the present disclosure, as shown in FIG. 4, the integrated motor controller 1 further includes a charging side magnetic ring 610 and a battery side magnetic ring 620.

The charging side magnetic ring 610 is mounted to an outer peripheral surface of the capacitor housing 500. The charging connector 100 is connected to the positive charging electrode connection sheet 540 and the negative charging electrode connection sheet 550 through an intermediate connector 120. The charging side magnetic ring 610 is sleeved on the intermediate connector 120. The battery side magnetic ring 620 is mounted to the outer peripheral surface of the capacitor housing 500. The battery side magnetic ring 620 is sleeved on the battery connector 110.

In this way, the charging side magnetic ring 610 can block external electromagnetic interference to the intermediate connector 120, and the battery side magnetic ring 620 can block the external electromagnetic interference to the battery connector 110. Therefore, the external electromagnetic interference to the battery may be avoided, and the voltage of the battery pack during the charging and discharging is more stable.

Moreover, a magnetic ring mounting position 593 configured for the battery side magnetic ring 620 to be mounted may be provided on the capacitor housing 500, so that the charging side magnetic ring 610 and the battery side magnetic ring 620 may be both integrated into the capacitor housing 500. Therefore, integration of the capacitor housing 500 can be improved, so that a structure of the capacitor housing 500 is more compact, to save the assembly space and achieve a better anti-electromagnetic interference effect of the capacitor housing 500.

An operating process of the integrated motor controller 1 is described with reference to the accompanying drawings.

When the battery pack supplies power to the driving motor, the current of the battery pack flows to the battery connector 110, flows from the positive electrode of the battery connector 110 to the smoothing capacitor 630 through the positive battery electrode connection sheet 510, then is supplied to the IGBT module 315 through the output connection sheet 530, and is converted by the IGBT module 315 to the AC, which flows to the driving motor 311. The current flows from the negative electrode of the battery connector 110 to the circuit safety protection member 600 through the negative battery electrode connection sheet 520, flows to the smoothing capacitor 630 through the negative input sheet 590, then is supplied to the IGBT module 315 through the output connection sheet 530, and is converted by the IGBT module 315 to the AC, which flows to the driving motor 311.

When the battery pack is charged and the charging voltage is less than 750 V, after the charging current flows through the charging side magnetic ring 610 through the charging connector 100, the charging current flows from the negative electrode of the charging connector 100 to the negative battery electrode connection sheet 520 through the negative charging electrode connection sheet 550, and then flows from the battery connector 110 to the battery pack. The charging current flows from the positive electrode of the charging connector 100 to the motor coil 312 and the IGBT module 315, and is boosted at the motor coil 312. The boosted current flows to the positive battery electrode connection sheet 510, and then flows from the battery connector 110 to the battery pack.

In some embodiments of the present disclosure, as shown in FIG. 3, FIG. 4, FIG. 7, and FIG. 8, the integrated motor controller 1 further includes a box 700, a driving board 730, a control board 740, and a power device 750.

A first side 701 of the box 700 in a thickness direction is provided with a first chamber 710. A second side 702 of the box 700 in the thickness direction is provided with a second chamber 720. The IGBT module 315 is mounted to the first chamber 710. The driving board 730 and the control board 740 are mounted to the first chamber 710. The driving board 730 is connected with the IGBT module 315 and the control board 740. The power device 750 is mounted to the second chamber 720 and is connected with the control board 740. The control board 740 is connected with a vehicle controller.

In other words, the first chamber 710 and the second chamber 720 are respectively arranged on two sides of the box 700 in the thickness direction. In this way, a side wall between the first chamber 710 and the second chamber 720 may separate the IGBT module 315, the driving board 730, and the control board 740 from the power device 750, which effectively reduces electromagnetic interference of the power device 750 on the IGBT module 315, the driving board 730, and the control board 740, and improves effectiveness of electric control. Moreover, each of the IGBT module 315, the driving board 730, the control board 740, and the power device 750 can be integrated into the box 700. The box 700 may fix the IGBT module 315, the driving board 730, the control board 740, and the power device 750. In this way, the structure is more compact, which helps reduce an overall volume of the integrated motor controller 1, and facilitates the mounting.

In some embodiments, the first chamber 710 may be divided into multiple small chambers, and the second chamber 720 may also be divided into multiple small chambers. The power device 750 is provided with an AC inductor, a DC inductor, a metal-oxide-semiconductor field-effect transistor (MOS) transistor, and an induction transformer. The AC inductor, the DC inductor, the MOS transistor, and the induction transformer are placed in the small chambers of the second chamber 720. In this way, electromagnetic interference between multiple power modules is further avoided, which helps improve electromagnetic compatibility.

In addition, a wiring hole is provided between the first chamber 710 and the second chamber 720. A wire harness may pass through the wiring hole to bring an electric device in the first chamber 710 into communication with an electric device in the second chamber 720, to facilitate electrical connection between a component in the first chamber 710 and a component in the second chamber 720.

For example, the control board 740, the driving board 730, and the IGBT module 315 are stacked in sequence. An electromagnetic shielding plate is arranged between the control board 740 and the driving board 730, to prevent the IGBT module 315 during operation from interfering with the control board 740.

The integrated motor controller 1 may be provided with an upper cover 760 and a lower cover 770. The upper cover 760 may be configured to cover the first chamber 710, to protect the component in the first chamber 710, for example, the IGBT module 315, the driving board 730, and the control board 740, and avoid positional interference between an external component and the IGBT module 315, the driving board 730, the control board 740, and the like. In addition, the lower cover 770 may be configured to cover the second chamber 720, to protect the power device 750 and avoid positional interference between another component and the power device 750.

Figure 9:
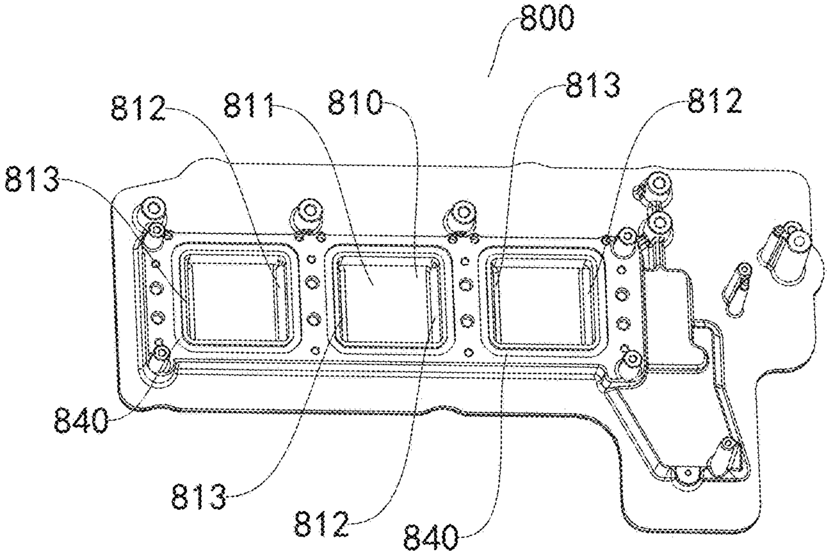
FIG. 9 is a schematic structural diagram of a water channel cover plate according to an embodiment of the present disclosure.
Figure 10:
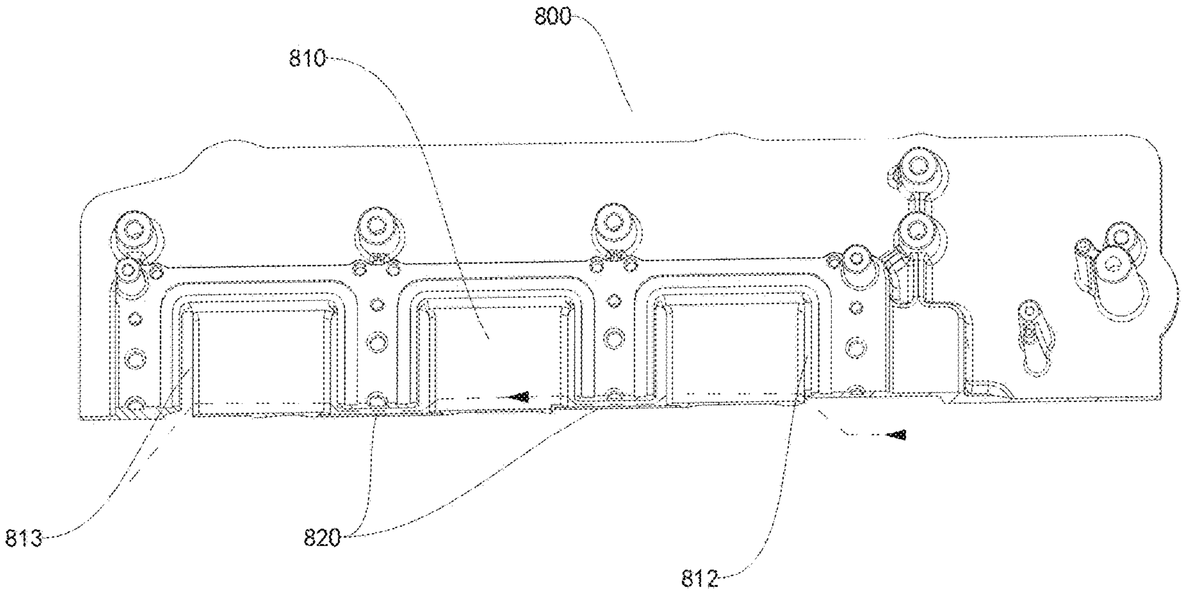
FIG. 10 is a cross-sectional view of a water channel cover plate according to an embodiment of the present disclosure.

In some embodiments of the present disclosure, as shown in FIG. 9 and FIG. 10, the integrated motor controller 1 further includes a water channel cover plate 800. The water channel cover plate 800 may be integrally connected to the box 700 through friction welding.

The water channel cover plate 800 is provided with a third water channel 810. The box 700 is provided with a first water channel 712 and a second water channel 711. The water channel cover plate 800 is connected with the box 700. The water channel cover plate 800 is configured to cover the first water channel 712 and the second water channel 711. The third water channel 810 is in communication with the first water channel 712 and the second water channel 711. A cooling liquid in the first water channel 712 flows into the third water channel 810 to dissipate heat for the IGBT module 315. A cooling liquid in the third water channel 810 flows into the second water channel 711 to dissipate heat for the power device 750.

In other words, the third water channel 810, the first water channel 712, and the second water channel 711 form a connected water channel. The cooling liquid in the third water channel 810, the cooling liquid in the first water channel 712, and the cooling liquid in the second water channel 711 may be shared. In some embodiments, the cooling liquid in the third water channel 810, the cooling liquid in the first water channel 712, and the cooling liquid in the second water channel 711 may circulate with each other. The IGBT module 315 may seal the third water channel 810, to avoid leakage of the cooling liquid in the third water channel 810, the cooling liquid in the first water channel 712, and the cooling liquid in the second water channel 711. In addition, the cooling liquid in the third water channel 810 may cool down the IGBT module 315, to prevent the IGBT module 315 from being damaged due to a high temperature and maintain the IGBT module 315 at a low temperature and stable operation thereof.

In addition, the first water channel 712 and the second water channel 711 may be sealed through the water channel cover plate 800, to avoid leakage of the cooling liquid in the first water channel 712 and the cooling liquid in the second water channel 711. The cooling liquid in the second water channel 711 may exchange heat with the power device 750 through an outer wall of the second water channel 711. In this way, a temperature of the power device 750 may be reduced, so that the power device 750 is maintained at a low temperature, and then operation stability of the power device 750 may be improved, thereby preventing the power device 750 from being damaged due to the high temperature.

Moreover, the third water channel 810, the first water channel 712, and the second water channel 711 are in communication with each other. A flow path of the cooling liquid is longer. The cooling liquid in the first water channel 712 may flow into the third water channel 810 to dissipate heat for the IGBT module 315, and the cooling liquid in the third water channel 810 may also flow into the second water channel 711 to dissipate heat for the power device 750. This may increase a utilization rate of the cooling liquid, and enables the cooling liquid to fully exchange heat with the power device 750 and the IGBT module 315.

Further, as shown in FIG. 9, the third water channel 810 includes multiple cooling cavities 811 arranged in a length direction of the third water channel. Multiple IGBT modules 315 are arranged. The multiple cooling cavities 811 are in one-to-one correspondence with the multiple IGBT modules 315. In this way, each cooling cavity 811 may exchange heat with the IGBT module 315 corresponding thereto, to dissipate heat for the IGBT module 315. The water channel cover plate 800 is provided with a sealing groove 840 surrounding the water channel cover plate 800. A sealing ring is arranged in the sealing groove 840. The sealing ring fills a gap between the IGBT module 315 and the water channel cover plate 800. Each IGBT module 315 may have a better sealing effect on the cooling cavity 811 corresponding thereto, to ensure sealing performance of the third water channel 810, and avoid leakage of a cooling liquid in the cooling cavity 811.

Moreover, each cooling cavity 811 includes a water inlet 812 and a water outlet 813. The water inlet 812 and the water outlet 813 that are adjacent to each other of two adjacent cooling cavities 811 are in communication with each other. The first water channel 712 is brought into communication with the water inlet 812 of the cooling cavity 811 adjacent to the first water channel. The second water channel 711 is brought into communication with the water outlet 813 of the cooling cavity 811 adjacent to the second water channel. At least one partition plate 820 is arranged on a side of the water channel cover plate 800 facing the box 700. The partition plate 820 is configured to prevent the water inlet 812 and the water outlet 813 that are adjacent to each other from being brought into communication with the second water channel 711.

In other words, the partition plate 820 may partition the second water channel 711 and the third water channel 810. Cooling liquids in adjacent cooling cavities 811 may be maintained in communication with each other through the water inlet 812 and the water outlet 813. In this way, the cooling liquid in the third water channel 810 can flow through each of the cooling cavities 811. This avoids a case that no cooling liquid exists in some cooling cavities 811 as a result of the cooling liquid directly flowing to the second water channel 711, and helps improve a cooling effect of the third water channel 810 on the IGBT module 315. In this way, the multiple IGBT modules 315 can stably exchange heat with the cooling cavities 811.

For example, one of two outermost cooling cavities 811 may be brought into communication with the second water channel 711 through the water outlet 813, and the other of the two cooling cavities 811 may be brought into communication with the first water channel 712 through the water inlet 812. In this way, the cooling liquid in the first water channel 712 may enter the third water channel 810 through the water inlet 812 of one of the outermost cooling cavities 811, and flow back to the second water channel 711 through the water outlet 813 of the other one of the cooling cavities 811. Therefore, circulation of the cooling liquid in the first water channel 712, the cooling liquid in the third water channel 810, and the cooling liquid in the second water channel 711 is achieved, and the cooling liquid can completely flow through the second water channel 711 and the third water channel 810, which helps increase the utilization rate of the cooling liquid.

Figure 7:
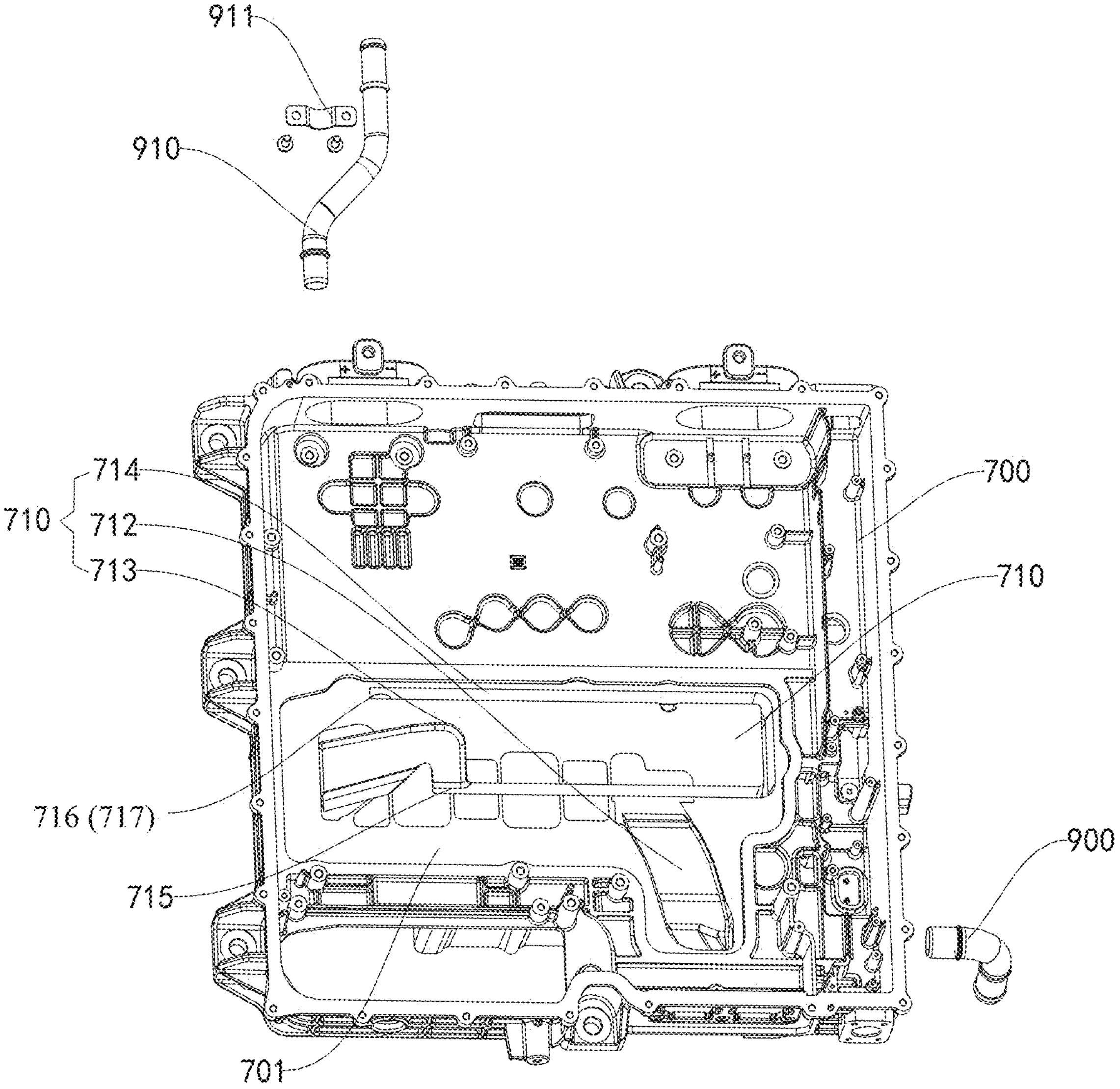
FIG. 7 is a schematic structural diagram of a box according to an embodiment of the present disclosure.

In some embodiments of the present disclosure, as shown in FIG. 7, the second water channel 711 includes a transition section 713 and an annular section 714.

The transition section 713 is brought into communication with the water outlet 813 of the cooling cavity 811 adjacent to the transition section. The annular section 714 surrounds the power device 750, and is configured to dissipate heat for the power device 750. A first end 715 of the annular section 714 is connected with an end of the transition section 713. A second end 716 of the annular section 714 is provided with a water outlet hole 717. An outer wall of the annular section 714 is configured to dissipate heat for the power device 750.

Based on the above, the cooling liquid flows into the first water channel 712 and then into the cooling cavity 811 adjacent to the first water channel 712. Then the cooling liquid in the third water channel 810 flows through the multiple cooling cavities 811 in sequence in a direction from the first water channel 712 to the transition section 713. Next, the cooling liquid flows from the cooling cavity 811 adjacent to the transition section 713 to the transition section 713, and finally flows from the transition section 713 to the annular section 714, and is discharged from the water outlet hole 717 of the annular section 714.

Moreover, a contact area between the annular section 714 and the power device 750 is larger, and a structure of the annular section 714 is more compact, which occupies a smaller space. Through the heat dissipation for the power device 750 by the annular section 714, a heat exchange effect of the second water channel 711 and the power device 750 may be improved, and then the power device 750 can be quickly cooled down, thereby achieving a better heat dissipation effect.

In addition, a depth of the annular section 714 is greater than a depth of the first water channel 712 and a depth of the transition section 713. In this way, on the one hand, a volume of the annular section 714 may be larger, and the annular section 714 may accommodate more cooling liquids, thereby improving the heat dissipation effect of the annular section 714 on the power device 750. On the other hand, transition between the first water channel 712 and the third water channel 810 may be smoother, transition between the transition section 713 and the third water channel 810 may be smoother, and the circulating flow of the cooling liquid between the second water channel 711 and the third water channel 810 may be smoother, so that the cooling liquid can fully exchange heat with the power device 750 and the IGBT module 315, to further improve the heat dissipation effect of the power device 750 and the heat dissipation effect of the IGBT module 315.

For example, the annular section 714 surrounds the induction transformer of the power device 750 in a "U" shape to dissipate heat. The MOS transistor, the AC inductor, and the DC inductor of the power device 750 are located outside the "U"-shaped annular section 714, and are attached to the outer wall of the annular section 714.

Figure 8:
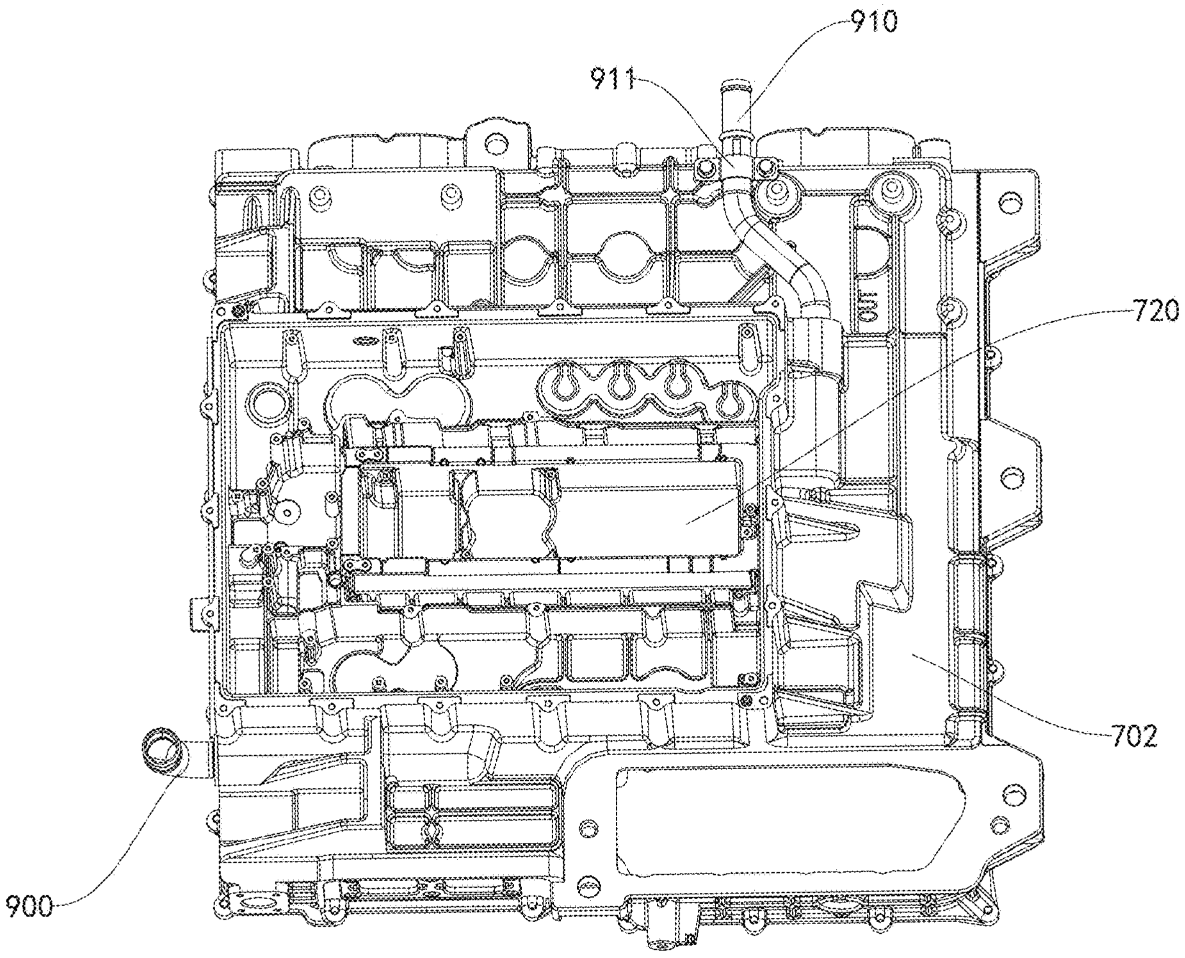
FIG. 8 is a schematic structural diagram of a box from another perspective according to an embodiment of the present disclosure.

In some embodiments of the present disclosure, as shown in FIG. 7 and FIG. 8, the integrated motor controller 1 further includes a water inlet pipe 900 and a water outlet pipe 910.

The water inlet pipe 900 is mounted to the box 700 and is in communication with the first water channel 712. The water outlet pipe 910 is mounted to the box 700 and is in communication with the water outlet hole 717. In this way, the cooling liquid may flow into the first water channel 712, the third water channel 810, and the second water channel 711 through the water inlet pipe 900. The cooling liquid may be discharged through the water outlet hole 717 and the water outlet pipe 910. In other words, after the cooling liquid fully exchanges heat with the power device 750 and the IGBT module 315, the cooling liquid in the first water channel 712, the cooling liquid in the third water channel 810, and the cooling liquid in the second water channel 711 may be discharged through the water outlet pipe 910. The cooling liquid in the first water channel 712, the cooling liquid in the third water channel 810, and the cooling liquid in the second water channel 711 are replenished through the water inlet pipe 900, to maintain sufficient cooling liquids in the first water channel 712, the third water channel 810, and the second water channel 711, and maintain the cooling liquids at a relatively low temperature, so as to improve cooling effects of the second water channel 711 and the third water channel 810 on the power device 750 and the IGBT module 315.

In addition, the water outlet pipe 910 and the water inlet pipe 900 are vertically arranged. For example, the water inlet pipe 900 may be arranged on a side of the box 700, and the water outlet pipe 910 may be arranged on an adjacent side of the box 700. In this way, positional interference between the water inlet pipe 900 and the water outlet pipe 910 may be avoided, to facilitate arrangement. In addition, lengths of the second water channel 711 and the third water channel 810 may be set to be relatively large, so that the second water channel 711 and the third water channel 810 can cover most of the box 700, which further improves the cooling effects of the second water channel 711 and the third water channel 810 on the power device 750 and the IGBT module 315. In addition, the cooling liquid in the second water channel 711 and the cooling liquid in the third water channel 810 can reduce a temperature of the box 700, and then may further dissipate heat for another component mounted to the box 700, thereby improving a heat dissipation effect of the box 700.

For example, since the water outlet pipe 910 is relatively long as a result of the above arrangement, a pressing plate 911 may be added. The pressing plate 911 is mounted to the box 700, and the water outlet pipe 910 is sandwiched between the pressing plate and the box 700, to fix a position of the water outlet pipe 910 relative to the box 700.

An integrated motor controller 1 according to another embodiment of the present disclosure includes a charging connector 100, a battery connector 110, a first charging circuit 200, and a second charging circuit 300.

The charging connector 100 is configured to connect to a charging device. For example, the charging connector 100 may be connected with a charging pile. The battery connector 110 is configured to connect to a battery pack. The first charging circuit 200 is connected with the charging connector 100 and the battery connector 110. The second charging circuit 300 is connected with the charging connector 100 and the battery connector 110. The second charging circuit 300 is provided with a boost module 310. One of the first charging circuit 200 and the second charging circuit 300 is turned on.

The first charging circuit 200 is connected with the charging connector 100 and the battery connector 110. In this way, when the charging connector 100 is connected with a charging device with a relatively high voltage (e.g., the voltage being not less than 750 V), for example, when the charging connector 100 is connected with a charging device with a charging voltage of 750 V, the first charging circuit 200 is in an on state, so that a current may directly charge the battery connector 110 through the first charging circuit 200, thereby achieving fast charging of a battery pack.

In addition, the second charging circuit 300 is connected with the charging connector 100 and the battery connector 110, and the second charging circuit 300 is provided with the boost module 310. In this way, when the charging connector 100 is connected with a charging device with a relatively low voltage (e.g., the voltage being less than 750 V), for example, when the charging connector 100 is connected with a charging device with a charging voltage of 470 V, the second charging circuit 300 is in an on state, and the boost module 310 may boost a voltage of the second charging circuit 300, so that the voltage of the second charging circuit 300 may be boosted to above 630 V, and then the battery pack may be fast charged.

In this way, the integrated motor controller 1 according to this embodiment of the present disclosure is applicable to different charging voltages, and has advantages such as high versatility and convenient charging.

In some embodiments of the present disclosure, when a voltage provided by the charging device is greater than a preset value, the first charging circuit 200 is turned on. In this case, the first charging circuit 200 is turned on, and the second charging circuit 300 is turned off. The charging device may directly charge the battery pack through the first charging circuit 200. When the voltage provided by the charging device is not greater than the preset value, the second charging circuit 300 is turned on. In this case, the second charging circuit 300 is turned on, and the first charging circuit 200 is turned off. The charging device may perform boosting through the boost module 310 of the second charging circuit 300, and then charge a battery. In addition, when the charging connector 100 is not connected with the charging device, the first charging circuit 200 and the second charging circuit 300 are both in an off state.

In some embodiments of the present disclosure, the boost module 310 includes a motor coil 312 and an electrical control bridge arm 316. Three sets of motor coils 312 are arranged. The electrical control bridge arm 316 includes three-phase bridge arms, which include three bridge arms. First ends of the three sets of motor coils 312 are respectively connected with midpoints of the three-phase bridge arms. Second ends of the three sets of motor coils 312 are each connected with the charging connector 100. In this way, a current flowing through the second charging circuit 300 may flow through the motor coil 312 and the three-phase bridge arms in sequence, to form the boost module 310 through the motor coil 312 and the three-phase bridge arms, and boost the current of the second charging circuit 300, thereby achieving the fast charging of the battery. The boost module 310 includes the three sets of motor coils 312 and the three-phase bridge arms. Therefore, a probability of a ripple current generated by the second charging circuit 300 can be reduced, and stability of an input voltage of the battery pack is further ensured.

An electric assembly 2 according to an embodiment of a second aspect of the present disclosure is described below with reference to the accompanying drawings. The electric assembly 2 includes the integrated motor controller 1 in the above embodiments of a first aspect of the present disclosure.

In some embodiments, referring to FIG. 1, the electric assembly 2 further includes the driving motor 311 and a transmission 3. The water outlet pipe 910 of the integrated motor controller 1 may be in communication with a cooling liquid channel of the transmission 3. In this way, the cooling liquid in the water channel of the integrated motor controller 1 may dissipate heat for the IGBT module 315 and the power device 750, and then flow to the cooling liquid channel of the transmission 3 to dissipate heat for the driving motor 311 and the transmission 3. A three-phase output terminal of the driving motor 311 is connected with the IGBT module 315. A coil of the driving motor 311 is connected with the charging connector 100.

The electric assembly 2 according to the embodiments of the present disclosure is applicable to different charging voltages through the above integrated motor controller 1, and has advantages such as high versatility and convenient charging.

Figure 11:
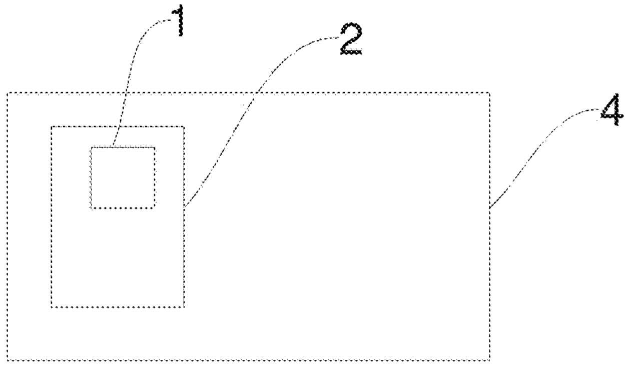
FIG. 11 is a schematic diagram of a vehicle according to an embodiment of the present disclosure.

As shown in FIG. 11, a vehicle 3 according to an embodiment of a third aspect of the present disclosure is provided. The vehicle 3 includes the electric assembly according to the above embodiment of the second aspect of the present disclosure.

The vehicle 3 according to the embodiments of the present disclosure is applicable to different charging voltages through the above electric assembly 2, and has advantages such as high versatility and convenient charging.

Other compositions and operations of the integrated motor controller 1, the electric assembly 2, and the vehicle 3 in the embodiments of the present disclosure are known to a person of ordinary skill in the art, and therefore are not described in detail herein.

In the description of this specification, the description of reference terms such as "an embodiment", "some embodiments", "an exemplary embodiment", "an example", "a specific example", or "some examples" means that features, structures, materials, or characteristics described based on the embodiment or example are included in at least one embodiment or example of the present disclosure. In this specification, schematic descriptions of the above terms do not necessarily refer to the same embodiment or example. In addition, the described features, structures, materials, or characteristics may be combined in a proper manner in any one or more embodiments or examples.

Although the embodiments of the present disclosure have been shown and described, a person of ordinary skill in the art should understand that various changes, modifications, substitutions, and variations may be made to the embodiments without departing from the principles and spirit of the present disclosure, and the scope of the present disclosure is defined by the claims and their equivalents.

What is claimed is:

1. An integrated motor controller, comprising:

a charging connector;

a battery connector;

a first charging circuit connected with the charging connector and the battery connector, and comprising a first control switch, the first control switch configured to control on/off of the first charging circuit;

a second charging circuit connected with the charging connector and the battery connector, and comprising a boost module and a second control switch, the second control switch configured to control on/off of the second charging circuit;

a capacitor housing, a boost capacitor, and a smoothing capacitor mounted to the capacitor housing;

a positive battery electrode connection plate mounted to the capacitor housing and connected with a positive electrode of the battery connector and a positive electrode of the smoothing capacitor;

a negative battery electrode connection plate mounted to the capacitor housing and connected with a negative electrode of the battery connector and a negative electrode of the smoothing capacitor;

an output connection plate mounted to the capacitor housing, and connected with the smoothing capacitor and an insulated gate bipolar transistor (IGBT) module of a motor controller;

a positive charging electrode connection plate mounted to the capacitor housing, and connected with a positive electrode of the charging connector and the boost capacitor; and a negative charging electrode connection plate mounted to the capacitor housing, and connected with a negative electrode of the charging connector, the boost capacitor, the smoothing capacitor, and the negative battery electrode connection plate.

2. The integrated motor controller according to claim 1, further comprising:

an alternating current (AC) charging and discharging connector; and an AC charging and discharging circuit comprising an on-board charger (OBC) and a direct current (DC)/DC converter, the OBC connected with the AC charging and discharging connector, and the DC/DC converter connected with the battery connector.

3. The integrated motor controller according to claim 1, wherein the charging connector comprises a DC charging connector; and the boost module comprises:

a motor coil of a driving motor, and the motor coil connected with the second charging circuit; and an electrical control bridge arm for the IGBT module of the motor controller, and the electrical control bridge arm connected with the motor coil.

4. The integrated motor controller according to claim 3, wherein:

the boost capacitor is connected with the charging connector, the battery connector, and the IGBT module; and the smoothing capacitor is connected with the IGBT module and the battery connector.

5. The integrated motor controller according to claim 1, wherein the capacitor housing has a first side edge, a second side edge, a third side edge, and a fourth side edge connected in a circumferential direction of the capacitor housing;

the positive battery electrode connection plate, the negative battery electrode connection plate, and the negative charging electrode connection plate are mounted to the first side edge;

the output connection plate is mounted to the second side edge; and the positive charging electrode connection plate is mounted to the third side edge.

6. The integrated motor controller according to claim 1, further comprising:

a circuit safety protection member mounted to the capacitor housing and connected with the negative battery electrode connection plate and the negative electrode of the smoothing capacitor.

7. The integrated motor controller according to claim 1, further comprising:

a charging side magnetic ring mounted to an outer peripheral surface of the capacitor housing, the charging connector connected to the positive charging electrode connection plate and the negative charging electrode connection plate through an intermediate connector, and the charging side magnetic ring sleeved on the intermediate connector; and a battery side magnetic ring mounted to the outer peripheral surface of the capacitor housing and sleeved on the battery connector.

8. The integrated motor controller according to claim 1, further comprising:

a heat dissipation metal plate attached to the capacitor housing; and heat transfer cement, a first surface of the heat transfer cement in a thickness direction of the heat transfer cement attached to the heat dissipation metal plate, and a second surface of the heat transfer cement in the thickness direction of the heat transfer cement attached to a box.

9. The integrated motor controller according to claim 8, further comprising:

a first chamber disposed on a first side of the box in a thickness direction of the box, a second chamber disposed on a second side of the box in the thickness direction of the box, and the IGBT module mounted to the first chamber;

a driving board mounted to the first chamber and connected with the IGBT module;

a control board mounted to the first chamber and connected with the driving board; and a power device mounted to the second chamber and connected with the control board.

10. The integrated motor controller according to claim 9, wherein the box comprises a first water channel and a second water channel; the first water channel is configured to be in communication with a water inlet pipe; and the second water channel is configured to be in communication with a water outlet pipe; and the integrated motor controller further comprises:

a water channel cover plate connected with the box, configured to cover the first water channel and the second water channel, and comprising a third water channel, the third water channel being in communication with the first water channel and the second water channel, wherein a cooling liquid in the first water channel flows into the third water channel to dissipate heat for the IGBT module; and a cooling liquid in the third water channel flows into the second water channel to dissipate heat for the power device.

11. The integrated motor controller according to claim 10, further comprising a plurality of IGBT modules including the IGBT module; wherein the third water channel comprises a plurality of cooling cavities disposed in a length direction of the third water channel; the cooling cavities are in one-to-one correspondence with the IGBT modules; each of the cooling cavities comprises a water inlet and a water outlet; a water inlet of a first one of two adjacent cooling cavities is adjacent to and in communication with a water outlet of a second one of the two adjacent cooling cavities; the first water channel is in communication with a water inlet of a cooling cavity adjacent to the first water channel; and the second water channel is in communication with a water outlet of a cooling cavity adjacent to the second water channel; and at least one partition plate is disposed on a side of the water channel cover plate facing the box; and the partition plate is configured to prevent communication between the second water channel and a water inlet and a water outlet adjacent to the second water channel.

12. The integrated motor controller according to claim 11, wherein the second water channel comprises:

a transition section in communication with a water outlet of a cooling cavity adjacent to the transition section; and an annular section surrounding the power device and configured to dissipate heat for the power device, a first end of the annular section connected with an end of the transition section, and a second end of the annular section comprising a water outlet hole, wherein a depth of the annular section is greater than a depth of the first water channel; and the depth of the annular section is greater than a depth of the transition section.

13. The integrated motor controller according to claim 12, further comprising:

the water inlet pipe mounted to the box and in communication with the first water channel; and the water outlet pipe mounted to the box and in communication with the water outlet hole, and the water outlet pipe and the water inlet pipe vertically disposed.

14. An integrated motor controller, comprising:

a charging connector, configured to connect to a charging device;

a battery connector, configured to connect to a battery pack;

a first charging circuit connected with the charging connector and the battery connector;

a second charging circuit connected with the charging connector and the battery connector, and comprising a boost module;

a capacitor housing, a boost capacitor, and a smoothing capacitor mounted to the capacitor housing;

a positive battery electrode connection plate mounted to the capacitor housing and connected with a positive electrode of the battery connector and a positive electrode of the smoothing capacitor;

a negative battery electrode connection plate mounted to the capacitor housing and connected with a negative electrode of the battery connector and a negative electrode of the smoothing capacitor;

an output connection plate mounted to the capacitor housing, and connected with the smoothing capacitor and an insulated gate bipolar transistor (IGBT) module of a motor controller;

a positive charging electrode connection plate mounted to the capacitor housing, and connected with a positive electrode of the charging connector and the boost capacitor; and a negative charging electrode connection plate mounted to the capacitor housing, and connected with a negative electrode of the charging connector, the boost capacitor, the smoothing capacitor, and the negative battery electrode connection plate, wherein one of the first charging circuit and the second charging circuit is turned on.

15. The integrated motor controller according to claim 14, wherein when a voltage provided by the charging device is greater than a first voltage, the first charging circuit is turned on; and when the voltage provided by the charging device is not greater than the first voltage, the second charging circuit is turned on.

16. The integrated motor controller according to claim 14, wherein the boost module comprises an electrical control bridge arm and three motor coils; the electrical control bridge arm comprises a three-phase bridge arm comprising three bridge arms; first ends of the three motor coils are respectively connected with midpoints of the three bridge arms; and second ends of the three motor coils are connected with the charging connector.

17. An electric assembly, comprising an integrated motor controller, wherein the integrated motor controller comprises:

a charging connector;

a battery connector;

a first charging circuit connected with the charging connector and the battery connector, and comprising a first control switch, the first control switch configured to control on/off of the first charging circuit;

a second charging circuit connected with the charging connector and the battery connector, and comprising a boost module and a second control switch, the second control switch configured to control on/off of the second charging circuit;

a capacitor housing, a boost capacitor, and a smoothing capacitor mounted to the capacitor housing;

a positive battery electrode connection plate mounted to the capacitor housing and connected with a positive electrode of the battery connector and a positive electrode of the smoothing capacitor;

a negative battery electrode connection plate mounted to the capacitor housing and connected with a negative electrode of the battery connector and a negative electrode of the smoothing capacitor;

an output connection plate mounted to the capacitor housing, and connected with the smoothing capacitor and an insulated gate bipolar transistor (IGBT) module of a motor controller;

a positive charging electrode connection plate mounted to the capacitor housing, and connected with a positive electrode of the charging connector and the boost capacitor; and a negative charging electrode connection plate mounted to the capacitor housing, and connected with a negative electrode of the charging connector, the boost capacitor, the smoothing capacitor, and the negative battery electrode connection plate.

18. A vehicle, comprising the electric assembly according to claim 17.

* * * * *